(12) United States Patent
Lietz et al.

(10) Patent No.: US 8,999,551 B2
(45) Date of Patent: Apr. 7, 2015

(54) CARRIER MATRIX FOR BATTERY CELL CONNECTORS

(75) Inventors: Franz-Josef Lietz, Oberhausen-Lirich (DE); Wera Skele, Viersen (DE)

(73) Assignee: Auto Kabel Managementgesellschaft mbH, Hausen i.W. (DE)

( * ) Notice: Subject to any disclaimer, the term of this patent is extended or adjusted under 35 U.S.C. 154(b) by 0 days.

(21) Appl. No.: 13/321,853

(22) PCT Filed: Jun. 8, 2010

(86) PCT No.: PCT/EP2010/057962
§ 371 (c)(1),
(2), (4) Date: Dec. 9, 2011

(87) PCT Pub. No.: WO2010/142658
PCT Pub. Date: Dec. 16, 2010

(65) Prior Publication Data
US 2012/0088143 A1 Apr. 12, 2012

(30) Foreign Application Priority Data
Jun. 8, 2009 (DE) .................. 10 2009 024 514

(51) Int. Cl.
| | |
|---|---|
| H01M 2/26 | (2006.01) |
| H01M 6/42 | (2006.01) |
| H01M 2/20 | (2006.01) |
| H01M 2/22 | (2006.01) |
| H01M 2/30 | (2006.01) |
| H01M 2/32 | (2006.01) |
| H01M 10/052 | (2010.01) |

(52) U.S. Cl.
CPC .............. *H01M 2/206* (2013.01); *H01M 2/202* (2013.01); *H01M 2/22* (2013.01); *H01M 2/305* (2013.01); *H01M 2/32* (2013.01); *H01M 10/052* (2013.01); *Y10T 29/49108* (2015.01)

(58) Field of Classification Search
None
See application file for complete search history.

(56) References Cited

U.S. PATENT DOCUMENTS

| | | | | |
|---|---|---|---|---|
| 3,623,917 A | * | 11/1971 | Chassoux | ........................ 429/99 |
| 6,211,646 B1 | | 4/2001 | Kouzu et al. | .................... 320/107 |
| 2009/0104516 A1 | * | 4/2009 | Yoshihara et al. | ............ 429/149 |
| 2009/0123830 A1 | * | 5/2009 | Kato et al. | ..................... 429/160 |

FOREIGN PATENT DOCUMENTS

| | | | | |
|---|---|---|---|---|
| DE | 102007020295 | | 11/2008 | ............. H02J 15/00 |
| EP | 0825658 | | 2/1998 | ............. H01M 2/34 |

(Continued)

OTHER PUBLICATIONS

The definition of "plugged in", (1997). In American Heritage&Reg; dictionary of idioms, the. Retrieved from http://search.credoreference.com/content/entry/hmidiom/plugged_in_be/0.*

(Continued)

*Primary Examiner* — Cynthia K. Walls
(74) *Attorney, Agent, or Firm* — Sunstein Kann Murphy & Timbers LLP

(57) ABSTRACT

A carrier matrix for battery cell connectors 1, comprising a carrier formed from a non-conductive material, at least one vertical receiver 34 formed in a column to vertically receive a battery cell connector 1, at least two columns arranged horizontally next to one another and a horizontal receiver 36 formed to horizontally receive a battery cell connector 1 connecting batteries arranged next to one another into columns.

18 Claims, 7 Drawing Sheets

(56) References Cited

FOREIGN PATENT DOCUMENTS

| | | | | |
|---|---|---|---|---|
| EP | 1077497 | | 2/2001 | H01M 2/20 |
| EP | 1450422 | | 8/2004 | H01M 2/20 |
| GB | 2083278 | | 3/1982 | H01M 2/20 |
| JP | 2004-127554 | * | 4/2004 | H01M 2/20 |
| WO | WO 89/04065 | | 5/1989 | H01M 2/20 |
| WO | WO 2006/126447 | * | 11/2006 | H01M 2/00 |
| WO | WO 2007/046587 | | 4/2007 | H01M 2/10 |

OTHER PUBLICATIONS

International Searching Authority, International Search Report—International Application No. PCT/EP2010/057962, dated Nov. 8, 2010, together with the Written Opinion of the International Searching Authority, 13 pages.

German Patent Office, Office Action, Application No. 102009024514.6-45, dated Sep. 30, 2010, 4 pages.

* cited by examiner

CARRIER MATRIX FOR BATTERY CELL CONNECTORS

The subject matter relates to a carrier matrix for battery cell connectors. Moreover, the subject matter relates to a battery cell module with at least two carrier matrices and a set of batteries and to a method for producing a battery cell module.

Batteries, in particular lithium-ion batteries, but also metal hybrid batteries, such as nickel-metal hydrid batteries, or lithium polymer batteries or other chemical energy storages, are becoming more and more significant in the car industry. In particular, owing to the requirement for alternative drive concepts, for example hybrid drives or purely electric drives, the storage of electric energy is of enormous importance for future automotive engineering.

The use of new types of batteries, for example lithium-ion batteries, as electric energy storages for electric motors in automotive engineering has proven to be advantageous. On the one hand, these accumulators store a large quantity of energy with a small volume and, on the other hand, batteries of this type are only subject to an ageing process to a limited extent. In particular, a "memory effect" does not occur therein. As a result, a large number of charging cycles can take place, so that the service life of the batteries substantially corresponds to that of a vehicle.

However, most batteries only provide low voltages between one and a plurality of tens of volts. These low voltages are not sufficient by far to drive an electric motor of an electric vehicle. Moreover, most batteries only provide an electric charge between 1000 and 5000 mAh, which is not sufficient to drive a vehicle for a sufficiently long time. For this reason, batteries are connected together to form so-called battery packs. A plurality of individual batteries (cells) can thus be connected together in series, so the output voltage of the battery packs is multiplied in accordance with the number of batteries connected in series. Battery packs are preferably used with a total of 96 batteries. Therein, for example, eight modules each with twelve batteries are connected to one another. For each module, six batteries arranged vertically one above the other are, for example, connected to one another in series in a column. A column of this type is connected in series to a second column of the same module arranged horizontally adjacent. Thus, for example, with an output voltage of 4 V for each battery, an overall output voltage is produced of 4 V times 12 batteries of 48 V for each module and 384 V for each battery pack.

The problem in the structure of a module is, however, the contacting of two respective batteries to be connected in series at their respective opposite poles. On the one hand, because of the chemical energy storage in the batteries, the battery pole of a first polarity is made of a different metal than the battery pole of a second polarity of the same battery. For example, in lithium-ion batteries, one battery pole is made of steel and a second battery pole is made of aluminium. Other combinations of metals are, however, also conventional. In most types of batteries, it is to be observed that the poles of different polarity are produced from different metals.

Moreover, owing to fluctuations due to production in the production of batteries, the distance between two opposing poles is affected by tolerance. In other words, if two batteries are arranged next to one another substantially in one plane, the poles could be not precisely co-planar. Also, the positive pole of a battery is frequently formed by a projection on one battery cover and the negative pole is formed by a recess on the opposing cover of the battery. If it is now desired to connect a positive pole of a first battery to a negative pole of a second battery, on the one hand, the use of different metals has to be taken into account and, on the other hand, the deviation of the poles from one another caused by tolerance.

Moreover, the current flow through the contacts is very high, as a large number of batteries are connected in series, which in the case of loading provide a plurality of amperes, possibly even several tens of amperes or several hundreds of amperes. These high currents have to flow through all the batteries and the respective battery cell connectors. The electrical contacts of the battery poles with the battery cell connectors therefore have to be low-resistance in order to minimise the heat losses in the connectors. Therefore, clean electrical contacting has to be ensured over the entire service life of the battery module. In order to ensure this, the battery cell connectors are regularly connected to the battery poles in a material-bonding manner.

In the known battery modules, the problem is now produced of establishing a low contact resistance between a battery pole and a battery cell connector taking into account the different metals of the battery poles during an automatical production. Moreover, the problem is produced of automatically compensating tolerances of the battery lengths. The problem is also produced of having a large number of batteries contact one another electrically and in a material-bonding manner one easily handleable working step.

This object is achieved in the present case by a carrier matrix for battery cell connectors, comprising a carrier formed from a non-conductive material, at least one vertical receiver formed in a column to vertically receive a battery cell connector, at least two columns arranged horizontally next to one another, and a horizontal receiver formed to horizontally receive a battery cell connector connecting batteries arranged next to one another in two columns.

It has been recognised that industrial manufacturing of battery cell modules is only possible by rapid and fault-free serial electrical contacting of a plurality of batteries with one another. For this purpose, material-bonding connections have to be provided between battery cell connectors and opposite poles of batteries with high clock speeds. Battery cell connectors can already be fixed in their positions in the carrier matrix provided for this by means of the present carrier matrix, to then be connected to the battery poles by means of material-bonding connecting methods. In particular, because of tolerances in the range of the width of the batteries, a tolerance range has to be bridged, in which a material-bonding connection has to be possible between a respective connecting part and a flat piece of a battery cell connector with a battery pole.

In industrial manufacturing, many batteries have to be electrically connected in series in a single working step. By means of the present carrier matrix, this can take place in that a plurality of battery cell connectors are brought to the corresponding battery poles, the battery cell connectors are pressed against the poles with a suitable tool, and, directly following this, a welding tool, for example a laser welding tool, connects the battery poles to the corresponding battery cell connectors in a material-bonding manner.

It is possible with the present carrier matrix to connect at least three batteries arranged in a column and two columns arranged next to one another in each case. By means of the vertical receivers, the battery cell connectors can be received to connect two batteries arranged one above the other. The respective last batteries in a column can be connected by means of a battery cell connector, which is arranged in a horizontal receiver. The horizontal receiver and the vertical receiver may be orthogonal with respect to one another in this case. By using the designations horizontal and vertical, the spatial orientation of the receivers is to be expressed. It is not mandatory for the vertical receiver to be vertical and for the horizontal receiver to be horizontal. Rather, it is the case that the horizontal receiver is substantially normal to the vertical receiver.

It is proposed by means of an advantageous exemplary embodiment that a printed circuit board receiver for a printed circuit board is formed in the carrier between the columns. This printed circuit board receiver can, in the present case, receive a printed circuit board, from which taps branch off, which can be connected to connecting regions of one respective battery cell connector. The temperature of the respective battery cell connector can be measured on the printed circuit board by means of these taps. It is proposed by means of an embodiment that the horizontal receiver and/or the vertical receiver are formed for receiving a battery cell connector in a flush manner. In this case, the battery cell connector can be flush with the side of the carrier facing the battery, at least on the side facing the battery.

For a mono-material connection of battery poles having different polarity, the battery cell connector can be formed for connection to the respective poles with a connecting part and a flat piece. According to an advantageous embodiment, it is proposed that the horizontal receiver and/or the vertical receiver are formed in such a way that on a side of the carrier facing a battery, a battery cell connector with a flat piece and a first connecting part is flush with the side of the carrier facing the battery. Thus, a battery cell connector is arranged in a vertical receiver and/or a horizontal receiver on the side of the carrier facing the battery in such a way that, for each battery cell connector, one flat piece and one connecting part point in the direction of the battery.

According to an advantageous exemplary embodiment, it is proposed that the horizontal receiver and/or the vertical receiver have latching noses for the positive fastening of the battery cell connectors. For example, it is possible for the battery cell connectors to be inserted into the carrier from the side facing the battery. In this case, the battery cell connectors are clipped by means of the latching noses into the receivers. By slight pressure on the battery cell connectors, the latching noses, which can be arranged on the side of the carrier facing the battery, bend outwardly, so the battery cell connectors arrive in the receivers and latch there. As a result, a carrier can rapidly and mechanically be equipped with battery cell connectors. The latching noses prevent the battery cell connectors falling out of the carrier before the material-bonding connection to the battery poles. Moreover, after the connection to the battery poles, because of the latching noses, the carrier can only still be withdrawn from the battery module by the exerting forces applied by the latching noses.

According to an embodiment, it is also proposed that the horizontal receiver and/or the vertical receiver, on the sides opposite to the latching noses, have holding shoulders as counter-bearings to receive the battery cell connector. The battery cell connectors have a first connecting part, an offset and a second connecting part with a flat piece arranged thereon. On the side opposite to the battery or on the side opposite to the latching noses, a holding shoulder can, for example, be provided in the region of the second connecting part in such a way that the region of the second connecting part not covered by the flat piece rests on the holding shoulder. A holding shoulder can also be provided in the region of the connecting part. Finally, a holding shoulder can be provided in the region of the first connecting part to fasten the first connecting part.

According to an embodiment, the carrier is formed from polyamide. A PA6-plastics material is preferably used.

According to an embodiment, it is proposed that the carrier has recesses between the horizontal receiver and/or the vertical receiver and the printed circuit board receiver in the region of connecting regions of the battery cell connectors. By means of these recesses, an electrical connection can take place between the printed circuit board and the battery cell connector, in particular the connecting region of the battery cell connector. By means of this, a temperature sensing on the battery cell connector is possible by means of a sensor arranged on the printed circuit board, for each battery cell connector.

According to an embodiment, it is also proposed that electric connecting leads are guided in the recesses between the printed circuit board and the connecting regions.

It is also proposed that two strut receivers arranged horizontally next to one another are arranged on the side of the carrier opposing the horizontal receiver. In one module, twelve batteries, for example, are connected in series by means of two carrier matrices. To tap the voltage across these twelve batteries, two contacts arranged horizontally next to one another are provided in each case at the ends and are connected, in each case, to the poles of the batteries associated with them. By means of struts, the voltages thus tapped can be conducted out of the surface of the carrier matrix and can be tapped there. As a result, a plurality of modules can be electrically connected to one another by means of module connectors.

According to an advantageous exemplary embodiment, it is proposed that the strut receivers have recesses to receive struts projecting out of the plane of the carrier. The voltages applied there can be tapped via the struts by means of plugs.

According to an embodiment, it is also proposed that two guides are fastened to the carrier on the side facing the batteries. The batteries may, for example, be guided to the carrier matrix with six pieces per column and two columns next to one another as a pallet in one production step. In order to be able to orient batteries in the correct position with respect to the battery cell connectors on the carrier matrix, it is proposed to fasten guides to the carrier. For each battery cell connector, as described above, one positive pole and one negative pole of the battery are connected together in series. These two batteries can be guided by means of the guides in the correct position to the battery cell connectors, or the first connecting part and the flat piece. Thus, the battery poles can be guided substantially coaxially to the venting openings of the battery cell connectors and can therefore be easily welded by means of a laser.

When using cylindrical batteries, it is proposed that the guides also, at least partially, have cylindrical surfaces.

According to an embodiment, it is also proposed that the guides are one-piece and can be positively connected to the carrier or are formed from the carrier. For example, it is possible to form a second matrix from guides, which can also be positively connected by means of clips to the carrier matrix. Both the carrier matrix and the matrix of the guides can be injection-moulded parts, which are produced by mass production.

As already described, the batteries are connected in series for each module. For this reason, it is proposed that, in each case, two vertical receivers arranged in columns located next to one another are formed in an alternating manner, an upper region of a first vertical receiver being formed to receive a connecting part and a lower region of the first vertical receiver being formed to receive a flat piece, and an upper region of a second vertical receiver being formed to receive a flat piece, and a lower region of the second vertical receiver being formed to receive a connecting part. Thus, two battery cell connectors arranged next to one another are in each case arranged in an alternating manner in the carrier matrix.

A battery cell connector can be formed from a first connecting part formed for connection to a battery pole of a first battery, a second connecting part, and a connecting element arranged between the connecting parts and making the connecting parts electrically contact one another, the first connecting part, at least on the side facing a battery pole, being formed from a first electrically conductive material and, in that arranged in a material-bonding manner on the second connecting part is a flat piece formed for connection to a second battery pole and formed, at least on the side facing the second battery pole, from a second electrically conductive material which is different from the first electrically conductive material.

Connections between battery cell connectors and battery poles are then possible with a low contact resistance if the different materials of the opposite battery poles are taken into account. For this purpose, a mono-material transition between the cell connector and battery pole can be selected. A first connecting part, which is connected to a first battery pole, can be formed from a first electrically conductive material. The battery cell connector connects the first connecting part by means of the connecting element to the second connecting part. A pole of a second battery, with the opposite pole to the first battery pole is to be electrically connected to the second connecting part. As this opposite battery pole is made of a different material to the first battery pole, the material coming into electrical and mechanical contact with this pole has to be different in order to ensure a low contact resistance.

In order to provide an economical battery cell connector, it is therefore proposed that a flat piece is arranged in a material-bonding manner on the second connecting part. The flat piece is made here from a second electrically conductive material. The first connecting part is preferably made of the same material as the first battery pole of the first battery and the flat piece is made of the same material as the second battery pole of the second battery.

By way of example, the first battery pole can be formed from aluminium. In this case, at least the surface of the first connecting part can also be formed from aluminium. The opposite pole of the second battery may, for example, be formed from steel. In this case, the flat piece can be formed from steel at least on the surface. The first connecting part is electrically connected via the connecting element to the second connecting part and, respectively, the flat piece, and current can flow via the battery cell connector between the battery poles of the two batteries.

According to an embodiment, it is proposed that the face of the flat piece facing the battery is co-planar with the first connecting part. In a battery module, the batteries are preferably arranged in such a way that the opposite poles of batteries arranged next to one another are substantially arranged in one plane. In order to now connect poles substantially lying in one plane to one another, the faces of the flat piece and the first connecting part are co-planar.

It should be mentioned that this co-planar nature can be eliminated by a flexibility of the connecting element during contacting. For example, the battery cell connector can be pressed by a tool against the battery poles during the material-bonding connection of the connecting part and the flat piece to the respective battery poles. Consequently, deviations caused by tolerance between the poles can be compensated, in particular, the battery cell connector can be displaced within a tolerance range.

According to an advantageous exemplary embodiment, it is proposed that the first and/or the second connecting part is formed as a flat part. Moreover, the flat piece can also be formed as a flat part. Owing to the configuration as a flat part, the connecting parts can be arranged close to the ends of the batteries when there is a small space requirement.

According to an embodiment, it is also proposed that the connecting part be formed in one piece with the first and/or the second connecting part. It is thereby possible, to produce the battery cell connector particularly economically. For example, the first connecting part, the second connecting part and the connecting element can be formed from the same material. For example, the first connecting part, the connecting element and the connecting part can be stamped from a metal sheet or a strip. As a result, the first and second connecting part and the connecting element can be economically produced in a single working step.

According to an embodiment, it is proposed that at least one connecting part is formed from aluminium, tin, zinc, copper, nickel, silver, gold, iron, steel or alloys thereof or is coated therewith. Connecting parts may be produced from solid material of one of the metals mentioned or alloys thereof. It is also possible for the connecting parts to be formed from a first metal and be coated with a second metal or alloys. In order to ensure good electrical contacting, in particular, a silver coating may be provided, for example. However, when selecting the material on the connecting part casing, care must be taken that this material corresponds with the material of the battery pole adjoining it, so that no galvanic cell is produced at the transition, which could destroy the material-bonding connection or has too high a contact resistance.

According to an embodiment it is proposed that the flat piece be formed from steel, tin, zinc, copper, nickel, iron, aluminium, silver, gold or alloys thereof or is coated therewith. In accordance with the configuration of the connecting parts, the flat piece can also either be made of a solid material or be coated with a suitable metal.

According to an embodiment, it is proposed that the flat piece be welded to the second connecting part. A friction welding method can be used here. For example, an ultrasound welding method can be used for contacting the flat piece with the connecting part. However, friction stir welding, torsional friction welding, rotary friction welding or another friction welding method is also conceivable. A multi-orbital friction welding method can also be used. Moreover, the flat piece can also be connected in a material-bonding manner by means of a resistance welding method to the connecting part.

For a tolerance compensation between the flat piece and the first connecting part with an arrangement of the battery poles to be connected in different planes, it is proposed that the connecting element be flexible.

A flexibility of this type can, for example, be achieved in that the connecting element has ribs spaced apart from one another. A plurality of individual ribs can be formed here as connecting webs between the connecting parts. The individual ribs are spaced apart from one another and have an intermediate space. As a result, increased flexibility of the connecting element is achieved.

In particular, a use of undulating ribs in the connecting element according to an advantageous exemplary embodiment ensures the required flexibility between the connecting parts by means of the connecting element.

According to an advantageous exemplary embodiment, it is proposed that the ribs are co-planar at least with the side of the first connecting part and/or the second connecting part remote from the battery. The ribs run in the same plane as the first and/or the second connecting part here.

According to an advantageous exemplary embodiment, it is also proposed that the ribs are formed projecting from the plane of at least one connecting part. The ribs may be formed in an undulating manner, for example, on the one hand. In the plane of a connecting part, so that the ribs do not project out of the plane of the connecting part. However, it is also possible for the ribs to project from a plane of a connecting part for example upwardly and downwardly. The two rib forms provide the required flexibility, the ribs projecting out of the plane of the connecting parts ensuring increased flexibility normal to the plane of a connecting part, and ribs running in the plane of the connecting parts being able to ensure increased flexibility in the plane of a connecting part.

According to an advantageous exemplary embodiment, it is also proposed that the ribs be formed by means of one of the methods of punching, cutting, laser cutting, water jet cutting from the connecting element. As explained above, the connecting element with the two connecting parts can be punched from a metal sheet or strip. At the same time, for example, the ribs can be punched. It is also possible for the ribs to be cut from the connecting element, in such a way the spacings between the ribs are formed in the connecting element.

According to an embodiment, it is also proposed that the connecting element be formed from at least two foils, in particular metal foils or coated foils. Two or a plurality of foils, for example, also ten foils, can be mounted above one another and form the connecting element. At the respective ends of the foils, the latter can be connected in a material-bonding manner to the connecting parts, so that a current flow from a connecting part via the foils to the other connecting part is possible. The foils offer the advantage that they ensure increased flexibility and are easy to apply.

According to an advantageous exemplary embodiment, it is also proposed that the connecting element be formed from one of the materials, aluminium strands, copper strands, aluminium braiding, or copper braiding. Apart from the use of foils, a large number of strands or braidings can also be used as the connecting element. These strands or braidings can be connected in a material-bonding manner at their respective ends to the connecting parts.

For a material-bonding connection of the litz wires, braidings or foils to the connecting parts, it is proposed that the connecting element is at least partially compacted in the region of a connecting part. Compacting can mean that the individual layers or strands are pressed such that they substantially have no air gap. Compacting can, for example, be achieved by brief pressing and heating. Compacted foils, compacted strands or compacted braidings can be connected particularly easily in a material-bonding manner to the connecting parts by a tool. In particular, a friction welding method, a resistance welding method or an ultrasound welding method can be applied during the compacting of the ends of the connecting element in the region of the connecting parts.

According to an embodiment, it is proposed that the connecting element be at least partially connected in a material-bonding manner to the connecting part in the region of at least one connecting part. This material-bonding connection, as explained above, can be achieved by welding. The material-bonding connection results in that the contact resistance between the connecting part and connecting element is small and therefore a development of heat through power loss is minimised.

According to an embodiment, it is also proposed that the connecting element, the first connecting part and/or the second connecting part forms an offset between a plane of the first connecting part and a plane of the second connecting part. As explained above, a flat piece is arranged on the second connecting part. The offset is proposed in order to bring the face of the flat piece facing the battery substantially into one plane with the face of the first connecting part facing the battery.

According to an embodiment, it is proposed that the offset is such that the face of the first connecting part facing the battery is co-planar with the face of the flat piece facing the battery. This co-planar nature makes it possible to connect the battery poles to be connected particularly easily in a material-bonding manner to the battery cell connector using a tool.

The connection between the battery cell connector and the respective battery pole can, for example, take place by means of a laser welding method. In laser welding, it is necessary, however, for a mechanical contact to already exist at the beginning of the welding process between the components to be joined. The first connecting part is therefore preferably pressed against one pole of a first battery and the flat piece is pressed against an opposite pole of a second battery. The parts thus mechanically brought into contact are then welded by means of a laser.

In battery modules, as described above, the temperature of the respective batteries has to be maintained within a specific temperature window. If a battery heats up too much, there is a risk that the battery will be destroyed or, in the worst case, explode. If this happens, the whole battery module is destroyed. Therefore, each individual battery should be monitored with respect to its temperature. To make this possible, it is proposed that the first connecting part has a connecting region formed from a third electrically conductive material on the side opposite to the battery. The connecting region can also be arranged on the second connecting part or the connecting element. A connecting wire of a printed circuit board can be connected, for example soldered, to this connecting region. A temperature tap on the battery cell connector is possible by means of this connecting wire. Thus, with the aid of the connecting region, the temperature of the battery cell connector and therefore, respectively, the temperature of the individual batteries can be monitored. A separate monitoring of each individual pair of batteries is possible, and an increase in the temperature above a limit value can be detected, whereupon the module can be switched off.

According to an embodiment, it is also proposed that the connecting region be connected flush with the face of the first or second connecting part or connecting element opposite to the battery. The installation space of the battery cell connector is thereby minimised.

According to an embodiment, the connecting region can be coated with the third metal. The coating with the third metal can take place before, during or after the forming of the connecting parts and the connecting element.

It is also possible for the connecting region to be roller-plated with the third metal. The connecting region or the third metal can be roller-plated onto the first connecting part or the second connecting part or the connecting element.

According to an embodiment, the connecting region is formed from one of the metals copper, nickel, tin, zinc, silver, gold or alloys thereof. A coating of the connecting region with a metal or an alloy is also possible.

According to an embodiment, it is also proposed that a venting opening for the battery is arranged in at least one connecting part. Lithium-ion batteries, in particular, but also other chemical energy stores, have to be able to "breathe". For this purpose, a venting opening on at least one of the poles, but preferably on each of the two poles of the battery, is necessary. If now, as proposed, the flat piece and the first connecting part are connected in a material-bonding manner to the pole, a venting of the venting opening already arranged on the pole is to be ensured. This venting is made possible by the venting opening in the connecting part and/or the flat piece. The venting opening can also be used for welding a connecting part to the corresponding pole of the battery by means of laser welding. For this purpose, the laser beam is guided along the inner periphery of the opening, the connecting part being connected in a material-bonding manner to the battery pole along the weld seam. The venting opening can therefore also be used without the use for venting the battery.

According to an advantageous exemplary embodiment, the venting opening is round.

It is also proposed that the venting opening has a projection breaking through its diameter. The venting opening can, for example, firstly be formed as a bore or other round opening here and, following this, a nose projecting therefrom can be taken out of the connecting part or the flat piece. The venting opening with the offset or projection taken out of the circumference can also be formed during the forming of the welding parts or the flat piece, for example during punching.

In order to connect the connecting part or the flat piece to the battery pole in a material-bonding manner, it is proposed that a diameter of the venting opening is smaller than a battery pole. It is therefore possible for the connecting part or the flat piece to be able to be pushed onto the battery pole and a mechanical contact between the connecting part or flat piece and battery pole to be ensured without the pole being pressed through the venting opening. The material-bonding connection between the battery pole and battery cell connector can then be produced through the venting opening, for example, using a laser in the region of the circumferential surface of the venting opening.

According to an advantageous exemplary embodiment, it is therefore proposed that a battery or battery pole be connected, at least partially, in a material-bonding manner to the first connecting part along the outer periphery of the venting opening. This material-bonding connection can, for example, take place by means of laser welding. Friction welding or ultrasound welding is also possible.

As already explained above, the flat piece and also the connecting part can have a venting opening. In order to ensure the venting by the connecting part and the flat piece, it is proposed that the flat piece has an opening coaxially to a venting opening in the second connecting part. Thus, the venting opening engages both through the flat piece and the second connecting part.

According to an embodiment, it is also proposed that a battery is connected in a material-bonding manner, at least partially, to the flat piece along the outer periphery of the opening. As already explained above for the connecting part, the battery or the battery pole can be connected to the flat piece in a material-bonding manner by means of a welding process. By means of this material-bonding connection, the contact resistance between the battery cell connector and the respective battery poles is low, so a power loss in the transition is small and a development of heat is substantially avoided or reduced.

According to an embodiment, it is also proposed that the venting opening of the second connecting part be greater than the venting opening of the first connecting part, and in that the size of the opening of the flat piece corresponds to the size of the venting opening of the first connecting part. Thus, the opening of the flat piece and the venting opening of the first connecting part, corresponding to one another, are in particular so great that their external diameter is smaller than the size of a pole of a battery. A larger opening, which is coaxial with the opening of the flat piece, may be provided in the second connecting part.

According to a further subject matter, a battery cell module with at least two carrier matrices described above is proposed, a carrier matrix being arranged in each case on a side of a set of at least two columns in each case of batteries arranged one above the other. The poles of the batteries in each case arranged substantially in a plane are electrically connected to one another by means of respective carrier matrix and the corresponding battery cell connectors. This means that a first carrier matrix is arranged on a first side of the batteries, and a second carrier matrix is arranged on a second side of the batteries. All the poles of the batteries arranged in the set can be connected in series to one another with the aid of these two carrier matrices.

A further subject matter is a method for producing a battery cell module with the steps of producing a carrier, fastening battery cell connectors in the horizontal receiver and the vertical receiver, pressing the carrier with the battery cell connectors onto a set of batteries, and material-bonding connection of the battery poles of the batteries to the battery cell connectors.

According to an embodiment, it is proposed that the at least two batteries are electrically connected in series by the battery cell connector. As a result, the output voltage of a module can be increased according to the number of batteries connected in series.

The features according to the embodiments can be freely combined with one another. The features of the embodiments are also independent per se and can be freely combined with all the features of the independent claims. In particular, the characterising part of claim 1 is not imperative for the realisation of a subject, so that features of the preamble can also be freely combined with all the other features of the description.

The subject matter will be described in more detail below with the aid of drawings showing embodiments. In the drawings.

Figure 1:
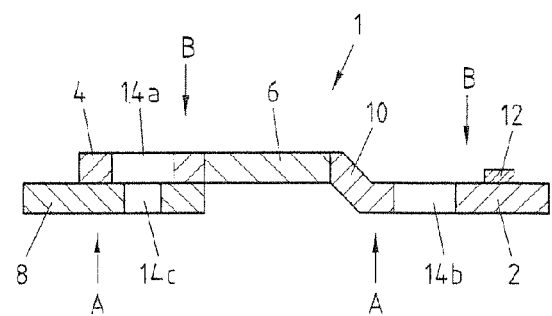
FIG. 1 shows a first sectional view of a battery cell connector.

FIG. 1 shows a view of a battery cell connector 1 in section. The sectional view shows that the battery cell connector 1 is formed from a first connecting part 2, second connecting part 4, a connecting element 6 and a flat piece 8 arranged on the second connecting part 4.

It can be seen from FIG. 1 that the connecting element 6 is arranged in one plane with the second connecting part 4. The connecting element 6 can be formed in one piece with the second connecting part 4 and the first connecting part 2. The connecting element 6 can also be a distinct component and be connected in a material-bonding manner to the first connecting part 2 and the second connecting part 4.

An offset 10 is arranged in the first connecting part 2. The offset 10 could, however, also be arranged in the connecting element 6 and in the second connecting part 4. Owing to the offset 10, the side A of the first connecting part 2 facing a battery is substantially co-planar to the side A of a flat piece 8 facing the battery.

The flat piece 8 is connected, on the side A of the second connecting part 4 facing the battery, to the second connecting part 4 in a material-bonding manner.

The first connecting part 2 and the flat piece 8 are preferably made from different electrically conductive materials, in particular metals, or coated with materials or metals of this type. For example, the first connecting part 2 can be formed from aluminium and the flat piece 8 from steel. It is also possible for the first connecting part 2 to be coated with a different metal to aluminium, for example tin, zinc, copper, nickel, iron, steel, silver, gold or the like or to be formed from a solid material. Alloys of the metals mentioned are also possible.

The flat piece 8 can also be formed from steel, tin, zinc, copper, aluminium, nickel, iron, silver, gold or the like or alloys thereof or be coated with these metals.

It can be seen in FIG. 1 that the first connecting part 2 has a venting opening 14*b*. The second connecting part 4 has a venting opening 14*a*, and the flat piece 8 has a venting opening 14*c*. The venting opening 14*c* is coaxial to the venting opening 14*a*. The venting opening 14*c* may, for example, have the same diameter as the venting opening 14*b*. The venting opening 14*a* can, for example, have a larger diameter than the venting opening 14*c*.

To assemble the battery cell connector 1 on a battery 20, on the side B opposite to the battery 20, the battery cell connector 1 is pressed against two poles 22, 24, not shown here, which have opposite poles (polarities) to one another, of two different batteries 20. The first connecting part 2 comes into contact here with a first pole 22 of a first battery 20 and the flat piece 8 comes into contact with a second pole 24 of a second battery 20 with an opposite polarity to the first pole. As soon as a contact has been established, the first connecting part 2 can be connected in a material-bonding manner to the first battery pole 22, for example by means of a laser through the venting opening 14*b*. The laser beam is guided here along the circumferential of the venting opening 14*b*, so a material-bonding connection is created. The flat piece 8 can be connected in a material-bonding manner by means of a laser to the second pole 24 of the second battery 20 through the venting opening 14*a* and the venting opening 14*c*. As soon as the weld seam has cooled or is hard, the pressure can be removed and the battery cell connector 1 is connected in a material-bonding manner to the respective poles 22, 24 of the two batteries 20.

In order to be able to monitor the temperature of the battery cell connector 1 and, respectively, of the respective batteries 20 in the connecting parts 2, 4, a connecting region 12 is arranged on the side B of the first connecting part 2 remote from the battery 20. The connecting region 12 may, however, also be arranged on the connecting element 6 and the second connecting part 4. The connecting region 12 can be formed from copper, silver, gold, tin, zinc, alloys thereof or other metals. The connecting region 12 on the surface of the first connecting part 2, the connecting region 6 or the second connecting part 4 can also be coated or roller-plated with the first connecting part 2, the connecting element 6 or the second connecting part 4. A tap can lead via the connecting region 12 to an integrated switching circuit or circuit board 40*a*, on which the tap can be monitored with respect to its temperature.

The connecting element 6 makes it possible to displace the sides A of the first connecting part 2 and of the flat piece 8 facing the battery 20 relative to one another in the direction X. As a result, during the material-bonding connection of the battery cell connector 1 to the batteries 20, not shown here, a tolerance compensation can take place within a tolerance range 26. It is therefore possible for tolerances in the position of the battery poles 22, 24 to be compensated and, nevertheless, for a material-bonding connection to be possible between the first connecting part 2 and battery pole 22, 24 or flat piece 8 and battery pole 22, 24 by means of a welding method.

Figure 2:
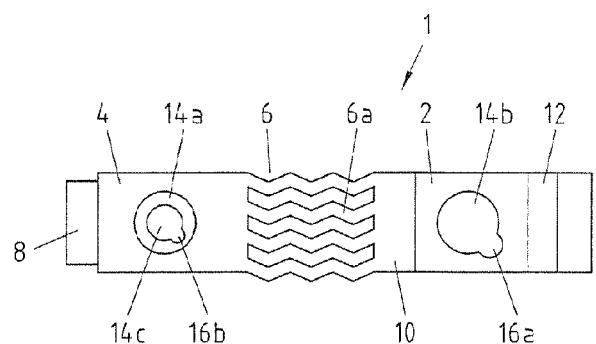
FIG. 2 shows a first plan view of a battery cell connector.

FIG. 2 shows a plan view of a further alternative of a battery cell connector. The same reference numerals show the same type of elements in each case in the figures. It can be seen in FIG. 2 that the connecting element 6 is formed from ribs 6*a* spaced apart from one another. As can be seen, the ribs are undulating. In FIG. 2, the ribs run in the plane of the second connecting part 4. It is, however, also possible for the ribs to project from the plane of the second connecting part 4. It is possible by means of the ribs 6*a* for the first connecting part 2 to be displaceable relative to the flat piece 8 or the second connecting part 4 in the direction Y to also achieve a tolerance compensation. It can be seen in FIG. 2 that the first connecting part 2 has the venting opening 14*b*. The projection 16*a* projecting from the periphery of the venting opening 14*b* is shown in the venting opening 14*b*.

A corresponding venting opening 14*c*, preferably of the same size with an offset 16*b*, is formed in the flat piece 8, as can also be seen in FIG. 2. A venting opening 14*a* in a first connecting part 4, the diameter of which is greater than the diameter of the venting opening 14*c*, is formed coaxially to the venting opening 14*c*.

Figure 3:
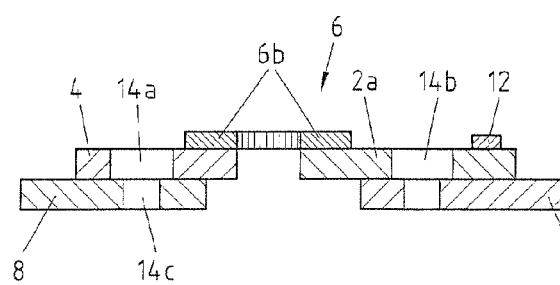
FIG. 3 shows a second sectional view of a battery cell connector.

FIG. 3 shows a sectional view with a further alternative. It can be seen in FIG. 3 that the offset 10 is formed by a first connecting part 2 formed in two pieces, with the parts 2*a* and 2*b*. These parts can be connected to one another in a material-bonding manner and be formed from the same metal or from different metals. It can furthermore be seen in FIG. 2 that the connecting element 6 is formed from a braiding. This may be an aluminium or copper braiding. Braidings made of different metals are also possible. It can also be seen that the connecting element 6 has two compacted regions 6*b*, which are in each case provided in the region of the first connecting part 2 and the second connecting part 4. The connecting element 6 can in each case be connected in a material-bonding manner to the first connecting part 2 and the second connecting part 4 at the compacted regions 6*b*. For this purpose, for example, friction welding, resistance welding, ultrasound welding or other welding methods or another connecting method may be used.

Figure 4:
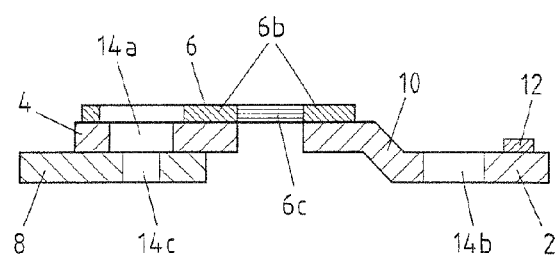
FIG. 4 shows a third sectional view of a battery cell connector.

FIG. 4 shows a further embodiment. In the embodiment shown in FIG. 4, the connecting element 6 is formed from foils 6*c*, which also have compacted regions 6*b*. The compacted region 6*b* in the region of the second connecting part 4 projects beyond the venting opening 14*a*. In the region of the venting opening 14*a* and in the region of the end of the spacing between the first connecting part 2 and second connecting part 4, the connecting element 6 can be connected in a material-bonding manner to the second connecting part 4. The connecting element 6 can also be connected in a material-bonding manner to the first connecting part 2. Since the compacted region 6*b* of the connecting element 6 substantially projects over a large part of the face of the second connecting part 4, a large contact face is produced and therefore a lower contact resistance. The second compacted region 6b can also extend along the offset 10 to the connecting region 12 over the first connecting part 2 and also have an opening in the region of the venting opening 14b.

Figure 5:
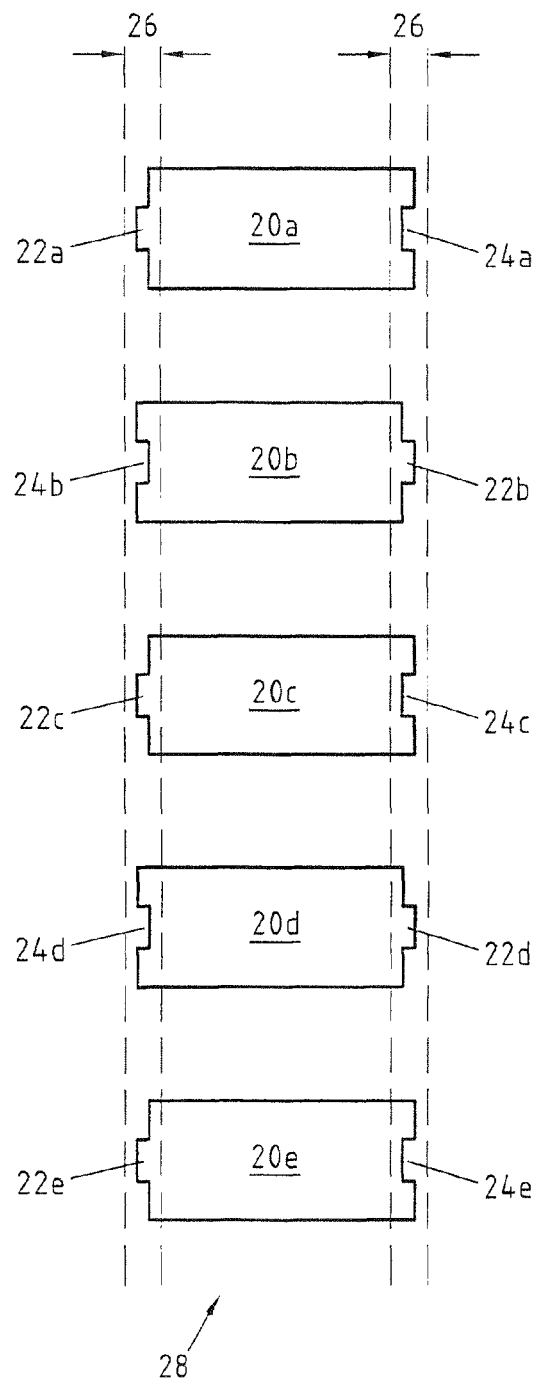
FIG. 5 shows a side view of a column with five batteries of a battery module.

FIG. 5 shows a schematic side view of a first column 28 of five batteries 20a-e, each with a first pole 22a-e and a second pole 24a-e, respectively. It can be seen that the batteries 20a-e are arranged one above the other in a column 28. It can furthermore be seen that the poles 22, 24 are arranged in an alternating manner. This means that, for example, a positive pole 22a of the battery 20a is arranged in a plane with a negative pole 24b of a battery 20b. This is in turn followed by a positive pole 22c, followed by a negative pole 24d and again a positive pole 22e.

It can furthermore be seen that the poles 22, 24 of the batteries 20 are arranged in a tolerance range 26, which is shown enlarged in the present case. The tolerance range 26 shows within what range the poles can be arranged. The positions 21 of the respective batteries, i.e. the distance between the poles 22, 24 from one another, are affected by tolerance. It follows from this that the poles 22, 24 are not always co-planar, so that during a connection to a battery cell connector 1, this tolerance has to be compensated.

For the sake of clarity, the column 28 is shown in FIG. 5 without the battery cell connectors. A first battery cell connector 1a would, for example, be arranged between the positive pole 22a and the negative pole 24b. Thereafter the positive pole 22b would be connected by a battery cell connector 1 to a negative pole 24c. The positive pole 22c would be connected by means of a battery cell connector to the negative pole 24d. The positive pole 22d would be connected by means of a battery cell connector 1 to the negative pole 24e. The positive pole 22e would be connected by a battery cell connector to a negative pole of a battery of a further column 28. The battery cell connectors 1 along a column 28 would be arranged vertically, and a battery cell connector I, which connects two columns 28 to one another, would be horizontally arranged.

Figure 6:
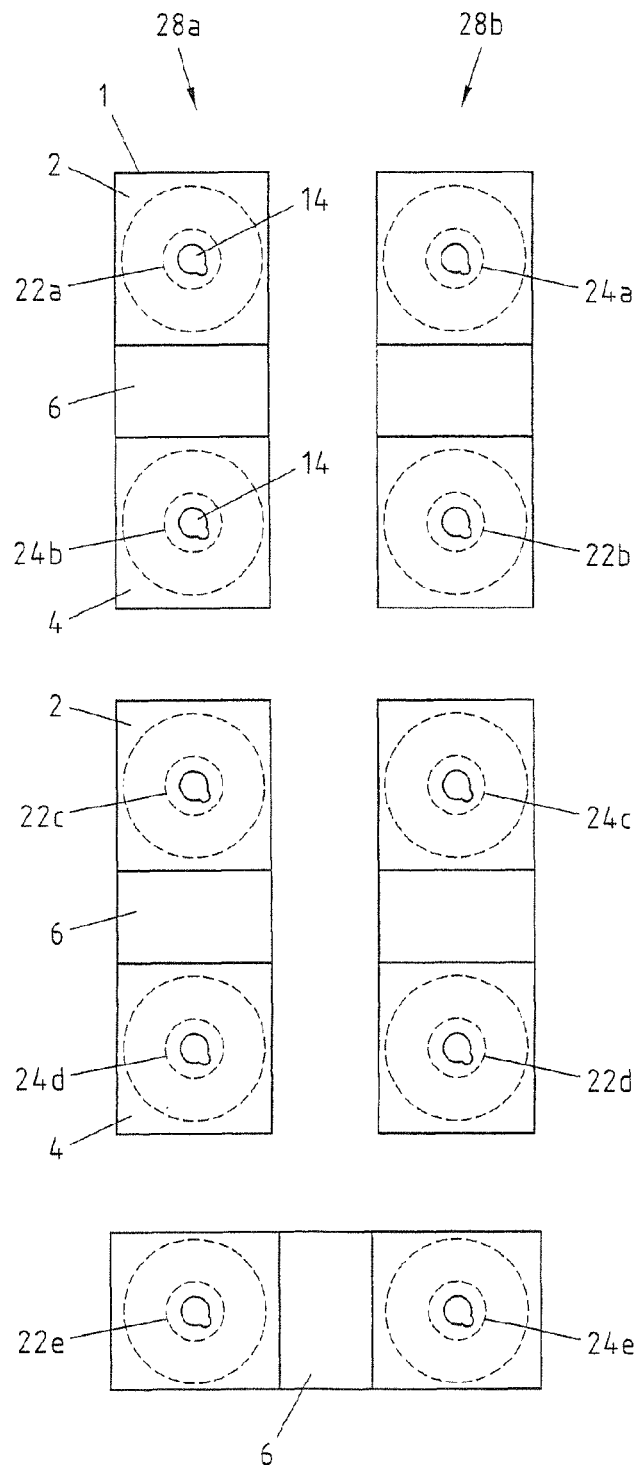
FIG. 6 shows a plan view of a battery module with five batteries connected in a column and two columns.

An arrangement of this type is to be seen, for example, in FIG. 6. FIG. 6 shows two columns 28a, 28b next to one another. It is to be seen here that the battery cell connectors 1 in each case connect the positive pole 22a to the negative pole 24b, the positive pole 22c to the negative pole 24d. The column 28a is connected by the positive pole 22e and a battery cell connector 1 to the negative pole 24e of the column 28b.

Figure 7:
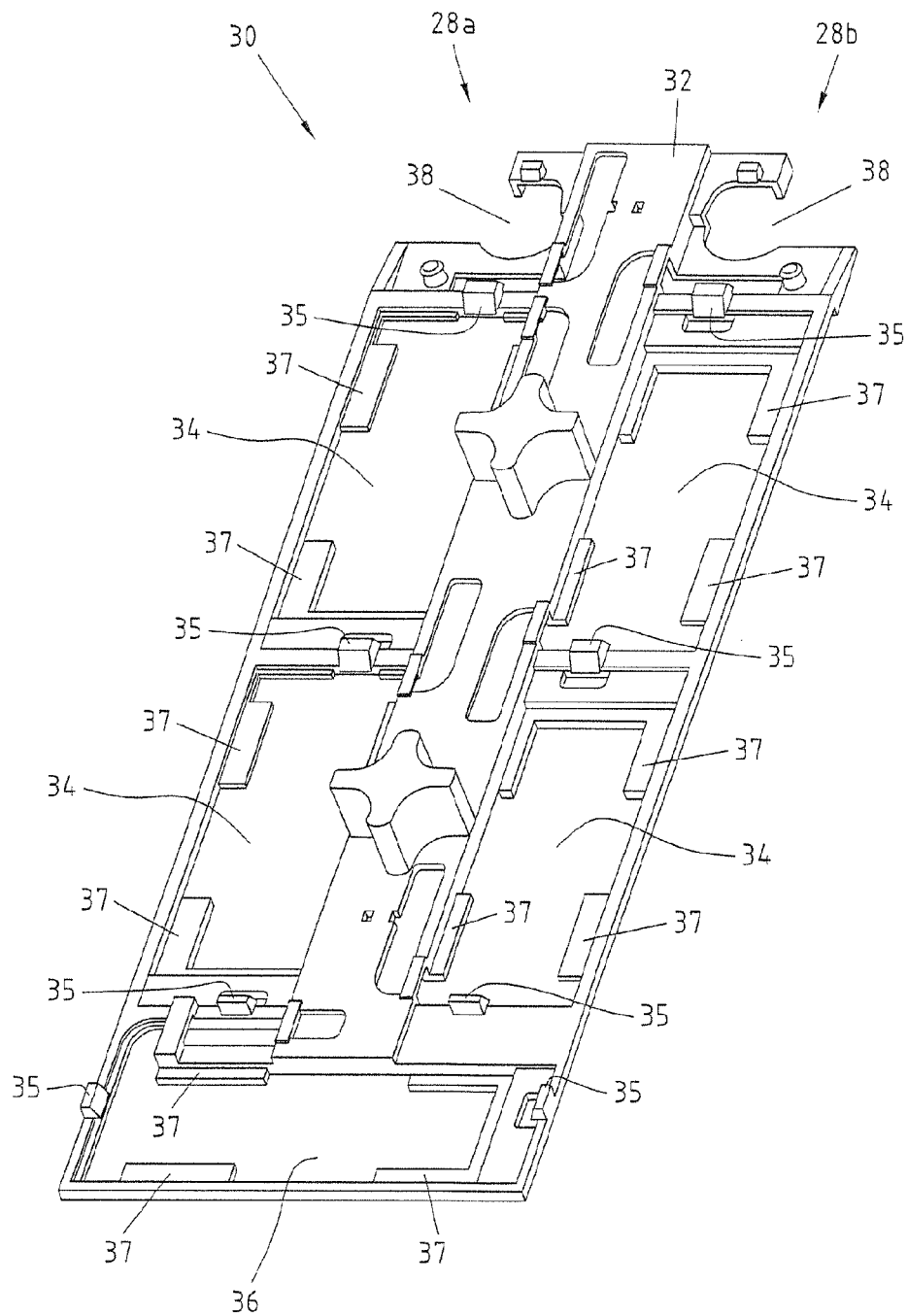
FIG. 7 shows a view on the battery side of a carrier matrix without a battery cell connector.

FIG. 7 shows a carrier matrix 30 with a carrier 32. It can be seen that the carrier 32 has receivers 34, 36, into which a battery cell connector 1 can be plugged respectively. The receivers 34 are vertical receivers. The carrier 32 shown has two columns each with two vertical receivers 34. Moreover, a horizontal receiver 36 is provided on the lower end of the carrier 32. Two strut receivers 38 are provided at the upper end of the carrier 32.

Moreover, it can be seen on the side facing the battery shown in FIG. 7 that latching noses 35 are arranged on the carrier 32. The latching noses 35 are arranged at the edges of the receivers 34, 36 and allow battery cell connectors 1 to latch into the receivers 34, 36.

Furthermore, holding shoulders 37 can be seen. It can be seen that the holding shoulders 37 spring back from the surface of the carrier 32 and are arranged on the side of the carrier remote from the battery.

Strut receivers 38 are provided in the upper region of the carrier 32. The strut receivers 38 have receivers to receive struts which project from the face of the carrier 32. Contact elements for contacting battery poles are provided in the strut receivers 38 on the side of the carrier 32 facing the battery. The contact elements are formed from different metals, in order to ensure a mono-material connection to battery poles with different polarity. Plugs 42 can be arranged on the struts.

Figure 8:
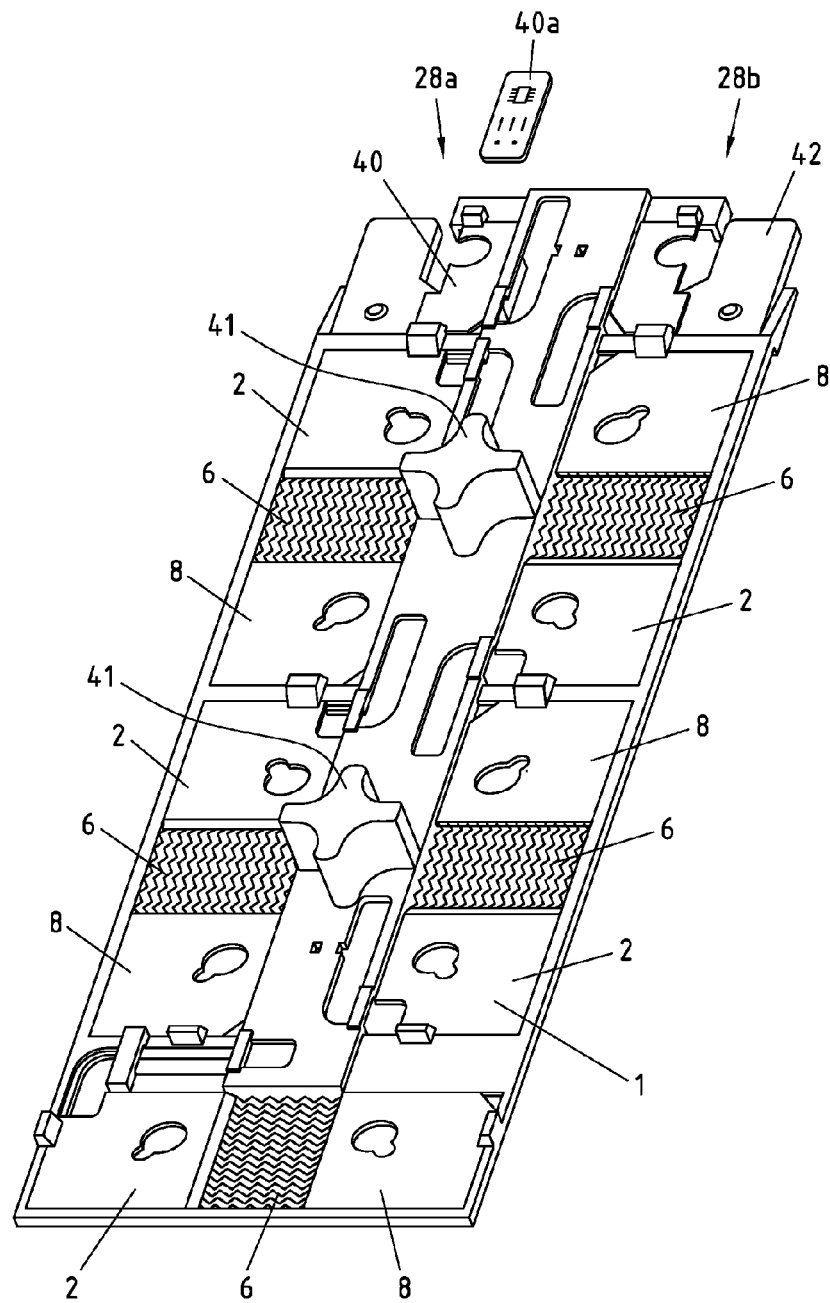
FIG. 8 shows a view on the battery side of a carrier matrix with a battery cell connector.

It can be seen on the side of the carrier 32 shown in FIG. 8 that the battery cell connectors 1 are positively latched with the surface of the carrier 32 into the latching noses 35. In particular, the battery cell connector 1 with the flat piece 8 is plugged into the vertical receiver 34. The flat piece 8 is flush with the face of the carrier 32 shown. The first connecting part 2 of the battery cell connector 1 is arranged in the vertical receiver 34. The first connecting part 2 is flush with the side of the carrier 32 shown.

The battery cell connectors 1 are arranged in a column in such a way that the connecting part 2 is firstly arranged in a column in a first receiver 34, then the connecting element 6 and then the flat piece 8 of a first battery cell connector 1, and the connecting part 2 is again arranged in a second receiver 34 arranged adjacent therto, then the connecting element 6 and then the flat piece 8 of a second battery cell connector 1.

It can furthermore be seen that the vertical receiver 34 and also the horizontal receiver 36 is formed in such a way that the flat piece 8 can be received together with the second connecting part 2 in one region, and the first connecting part can be received in a second region, the receivers 34, 36 also receiving the connecting element 6.

Guides 41 can be seen in the central web of the carrier 32. These guides 41 allow a precise positional orientation of batteries to the battery cell connectors 1.

A guide matrix can also be connected to the side of the carrier 32 shown in FIG. 8. Said guide matrix can be formed from guides for batteries.

The batteries can be brought concentrically to the venting openings in the battery cell connectors by means of the guides.

Figure 9:
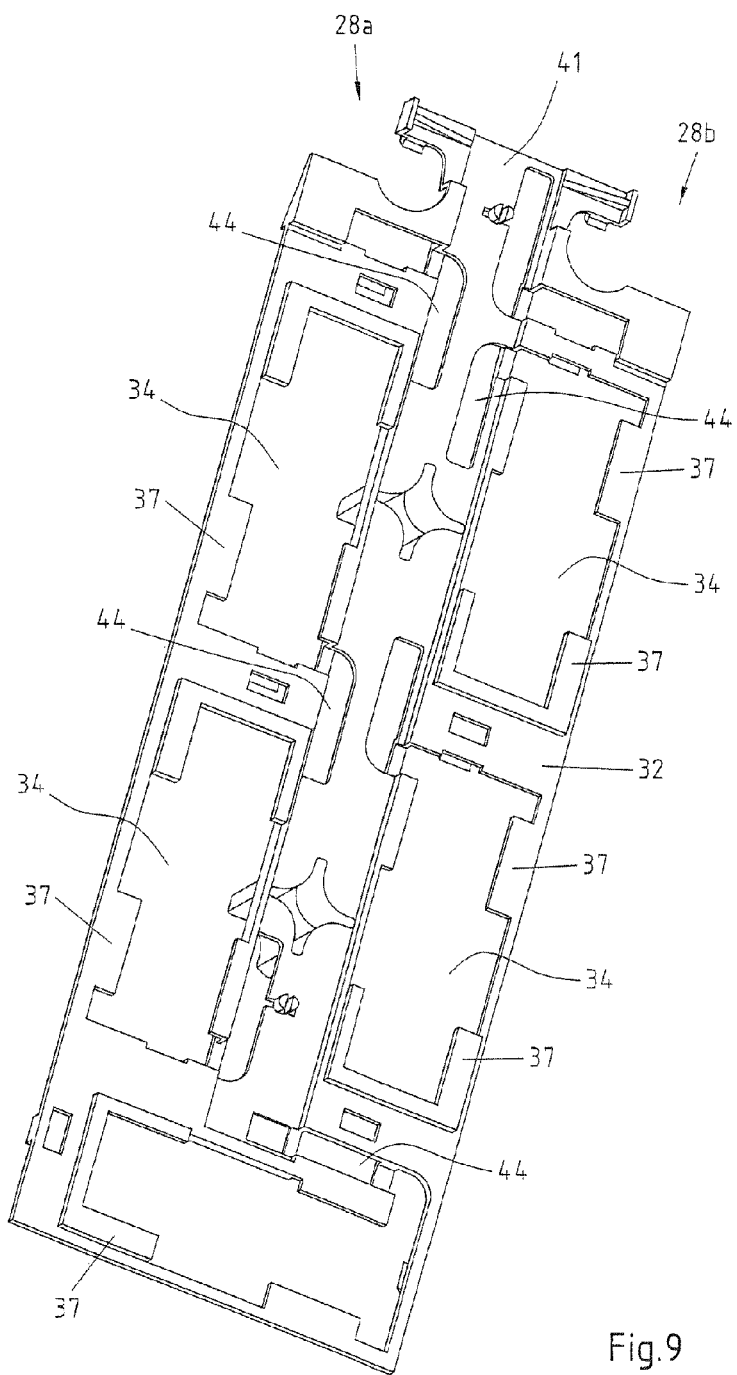
FIG. 9 shows a view remote from the battery of a carrier matrix without a battery cell connector.

FIG. 9 shows the side of the carrier 32 opposite to the battery. The holding shoulders 37 can be seen again. Moreover, a printed circuit board receiver 40, into which a printed circuit board 40a can be plugged, is provided between the columns of vertical receivers 34.

It can furthermore be seen that recesses 44 are provided in the region of the connecting regions 12, by means of which the temperatures of the battery cell connectors can be tapped.

Figure 10:
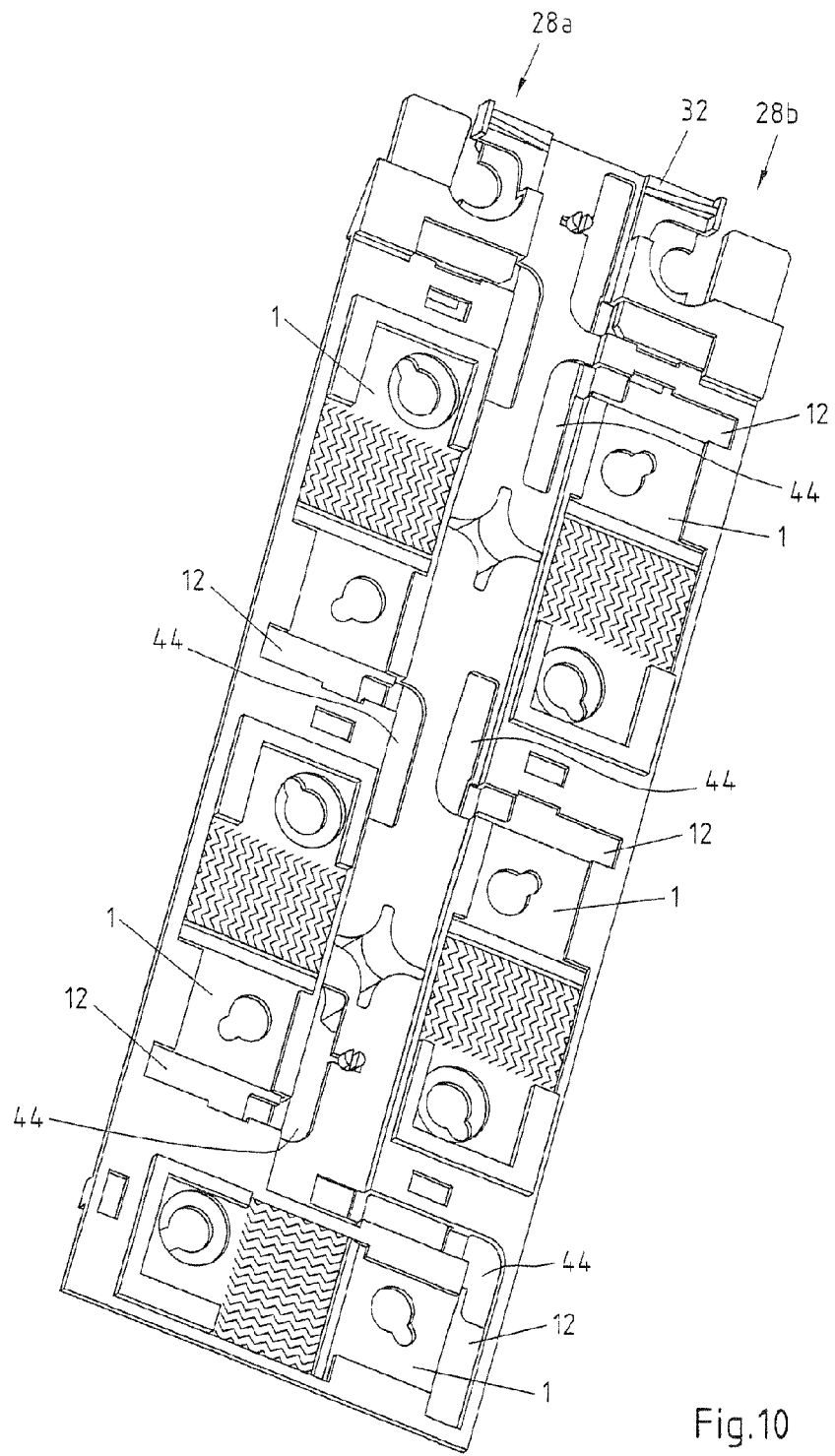
FIG. 10 shows a view of a carrier matrix remote from the battery with a battery cell connector.

FIG. 10 shows the carrier 32 with battery cell connectors 1 plugged in from the side remote from the battery.

To produce a battery module of, for example, twelve batteries, six batteries in columns are brought together to the carrier 32 in each case. The battery poles 22, 24 are oriented concentrically with respect to the venting openings 14 of the battery cell connectors 1 by the guides 41. By means of a tool, the carrier 32 together with the battery cell connectors 1 is pressed against the battery poles 22, 24. Since the battery cell connectors 1 are flexible, a tolerance compensation can be realised in the region of the battery poles 22, 24. Moreover, a mono-material contacting of the battery poles is possible as the flat pieces 8 can be formed from a different material to the first connecting parts 2. Once the carrier 32 together with the battery cell connector 1 has been pressed against the battery poles 22, 24, these rest mechanically on the battery poles. Furthermore, the contact regions of the struts rest on the upper batteries of the battery module. The battery poles are welded to the battery cell connectors by means of a laser welding tool along the peripheral faces of the venting openings 14.

The carrier matrix is formed in a complementary manner on an opposing side of the set of twelve batteries. This means that three vertical receivers 34 are provided and no horizontal receivers 36 and also no strut receivers 38. The current therefore flows through all the batteries in series and the voltage across all the batteries can be tapped at the struts.

By means of the present carrier matrix, an automated production of battery modules from a plurality of batteries is possible.

The invention claimed is:

1. Carrier matrix for battery cell connectors, comprising, a carrier formed from a non-conductive material;
at least one first receiver arranged within the carrier to receive along a first direction a battery cell connector connecting two batteries arranged next to one another defining a first column along the first direction, wherein the first receiver is formed such that the battery cell connector can be snapped into the first receiver so as to be positively fastened therein by latching noses that are integral to the carrier; and
a second receiver formed to receive along a second direction a battery cell connector connecting two batteries arranged next to one another, each of the two batteries residing in a separate column, the two batteries defining a row along the second direction, wherein the second receiver is formed such that the battery cell connector can be snapped into the second receiver so as to be positively fastened therein by latching noses that are integral to the carrier
wherein the battery cell connector is electrically conductive.

2. Carrier matrix for battery cell connectors, comprising: a carrier formed from a non-conductive material;
at least one vertical receiver formed in a column arranged within the carrier to vertically receive a battery cell connector, wherein the vertical receiver is formed such that the battery cell connector can be plugged into the vertical receiver;
at least two of said columns arranged within the carrier being arranged horizontally next to one another; and
a horizontal receiver formed to horizontally receive a battery cell connector connecting batteries arranged next to one another in two columns, wherein the horizontal receiver is formed such that the battery cell connector can be plugged into the horizontal receiver,
wherein a printed circuit board receiver for a printed circuit board is formed in the carrier between the columns.

3. Carrier matrix of claim 1, wherein the second receiver and/or the first receiver are formed to receive in a flush manner a battery cell connector.

4. Carrier matrix of claim 1, wherein the second receiver and/or the first receiver are formed in such a way that, on a side of the carrier facing a battery, a battery cell connector with a flat piece and a first connecting part is flush with the carrier.

5. Carrier matrix of claim 1, wherein the second receiver and/or the first receiver have the latching noses for the positive fastening of the battery cell connectors.

6. Carrier matrix of claim 5, wherein the second receiver and/or the first receiver have, on the sides opposite to the latching noses, holding shoulders as counter bearings to receive the battery cell connector.

7. Carrier matrix of claim 1, wherein the carrier is formed from polyamide.

8. Carrier matrix of claim 2, wherein the carrier has recesses between the second receiver and/or the first receiver and the printed circuit board receiver in the region of connecting regions of the battery cell connectors.

9. Carrier matrix of claim 2, wherein electric connecting leads are guided between the printed circuit board and the connecting regions in the recesses.

10. Carrier matrix of claim 1 further comprising two strut receivers arranged next to one another along a second direction on the side of the carrier opposing the second receiver are arranged in the carrier.

11. Carrier matrix of claim 1 further comprising strut receivers having recesses to receive struts projecting from the face of the carrier.

12. Carrier matrix of claim 1 further comprising two guides fastened to the carrier on the side facing the batteries.

13. Carrier matrix of claim 1 further comprising guides having at least partially cylindrical lateral surfaces.

14. Carrier matrix of claim 1 further comprising guides, which are one-piece and can be positively connected to the carrier.

15. Carrier matrix of claim 1, wherein two second receivers arranged in columns arranged next to one another respectively are formed in such a way that an upper region of a first receiver is formed to receive a connecting part and a lower region of the first receiver is formed to receive a flat piece and an upper region of a further first receiver is formed to receive a flat piece and a lower region of the further first receiver is formed to receive a connecting part.

16. Battery cell module with at least one carrier matrix according to claim 1, wherein a carrier matrix is arranged on a first side of a set of at least two columns of batteries arranged one above the other respectively and a second carrier matrix having exclusively first receivers is arranged on the second side of the set.

17. Method for producing a battery cell module, comprising:
producing a carrier from a non-conductive material;
snapping, so as to positively fasten by latching noses integral with the carrier, a first battery cell connector in a column receiver, arranged within the carrier, formed to receive battery cell connectors in a first direction defining a column of batteries;
snapping, so as to positively fasten by latching noses integral with the carrier, a second battery cell connector in a row receiver, arranged within the carrier, formed to receive the battery cell connectors in a second direction defining a row of batteries;
arranging a set of batteries next to one another in two columns;
pressing the carrier with the battery cell connectors onto the set of batteries; and
connecting battery poles of the batteries to the battery cell connectors by material-bonding.

18. The carrier matrix of claim 1 wherein said second receiver extends along a longitudinal axis normal to an extension of a longitudinal axis of said at least one first receiver.

* * * * *